United States Patent [19]

DeWorth

[11] Patent Number: 5,181,371

[45] Date of Patent: Jan. 26, 1993

[54] FLEXIBLE JOINT ASSEMBLY FOR PARTITION ASSEMBLAGE

[75] Inventor: Sam DeWorth, Pickerington, Ohio

[73] Assignee: Crane Plastics Company, Columbus, Ohio

[21] Appl. No.: 740,425

[22] Filed: Aug. 5, 1991

[51] Int. Cl.⁵ .............................................. A01D 75/20
[52] U.S. Cl. ..................... 56/17.4; 56/320.1; 403/291
[58] Field of Search ............. 56/17.4, 320.1, DIG. 24; 52/730, 403; 49/467, 470; 403/291, 292, 361; 16/225

[56] References Cited

U.S. PATENT DOCUMENTS

| | | | |
|---|---|---|---|
| 3,727,386 | 4/1973 | Jespersen et al. | 56/320.1 |
| 4,030,277 | 6/1977 | Christopherson | 56/320.1 |
| 4,134,249 | 1/1979 | Wuerker et al. | 56/320.1 X |
| 4,241,567 | 12/1980 | Carolan | 56/17.4 |
| 4,277,937 | 7/1981 | Luick | 56/17.5 |
| 4,309,863 | 1/1982 | Wattron | 56/320.1 |
| 4,671,052 | 6/1987 | Martin et al. | 56/17.4 |
| 4,750,301 | 6/1988 | Croxford | 52/403 X |

FOREIGN PATENT DOCUMENTS 2529402 1/1976 Fed. Rep. of Germany.

Primary Examiner—David J. Bagnell
Attorney, Agent, or Firm—Vorys, Sater, Seymour & Pease

[57] ABSTRACT

An improved flexible joint assembly is disclosed for use in connecting partition members for use in lawn mower drag shields. One of the members includes a receiving groove made of a rigid and heat bondable material. The other partition member includes a resiliently flexible portion which protrudes from a marginal edge thereof. The protruding portion is placed in interfitting heat bonded engagement with the rigid receiving groove so that the latter interfaces and encompassing a substantial area of the protruding portion.

18 Claims, 2 Drawing Sheets

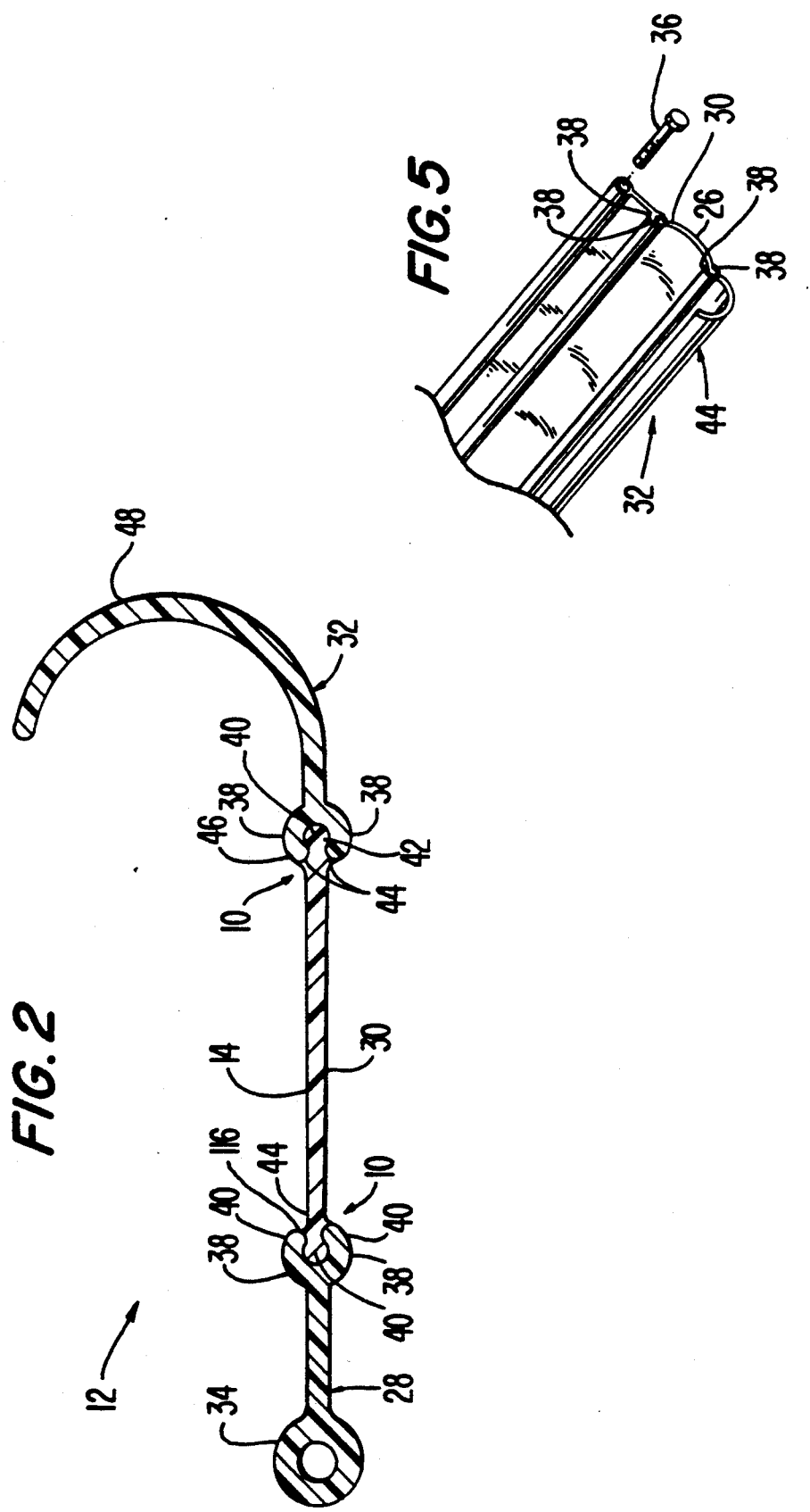

FLEXIBLE JOINT ASSEMBLY FOR PARTITION ASSEMBLAGE

BACKGROUND OF THE INVENTION

This invention relates to improved flexible joint assemblies having a variety of uses, such as lawn mower drag shields, door seals and the like.

Where lawn mowers are concerned, since they employ a high speed rotary cutter, they are required to have a drag shield which protects the users' legs and feet from being injured by loose objects which may be propelled rearwardly during operation of the mower. In the usual case, the drag shield trails behind the mower as it is moved forward, but when pulled backward the shield inhibits the mower's maneuverability. Ultimately, the shield becomes torn, or is otherwise broken off of the machine.

One known type of shield includes a plurality of separate, and extruded plastic strips or panels which are bonded together along their respective longitudinal edges; such as described in U.S. Pat. No. 4,030,277. In this patented construction, a pair of relatively rigid strips are joined together by a flexible intermediate strip. The flexible intermediate strip facilitates movement of the shield so that it is capable of easily reversing its position. Joints are located between the intermediate flexibly resilient strip and the rigid strips, and include grooves in the flexible strip which mate with projections on the marginal edges of the rigid strips. Drag shields having this type of construction have been known to fail standard tests required by existing manufacturing lawn mower requirements. For example, one of the tests includes subjecting a shield to a torsion action wherein adjacent panel strips are twisted in a complete revolution relative to one another. Conventional shields, such as described above, have been known to fail such a torsion test. Accordingly, there is a continuing desire to improve upon the overall performance of drags joint assembly, especially, shields, and in particular their ability to withstand the rigorous testing procedures and usages.

SUMMARY OF THE INVENTION

This invention provides an improved flexible joint assembly for partition assemblages which are useful for many different purposes, including lawn mower drag shields. In one illustrated embodiment, a pair of discrete interfitting members are flexibly joined together by one of the members snugly receiving an interfitting protrusion of the other discrete member. The receiving means is formed adjacent at least one marginal edge portion of the member and is made of a rigid, heat bondable material. The other member includes a resiliently flexible, heat bondable, portion which protrudes from a marginal edge thereof. The protrusion member and receiving means are fitted snugly together and heat bonded to each other. The rigid receiving means engages a sufficient surface area of the interfitting protrusion, such that the joint formed by receiving means and the interfitting protrusion has enhanced strength. Such a bond is capable of resisting failures when subjected to torsional and bending forces resulting from the members being rotated relative to each other.

In another illustrated embodiment, the flexible member includes a pair of recesses formed adjacent its protruding portion which mate with complementary, bifurcated arms of the receiving means. The arms define a groove means which is sized and shaped to engage a substantial surface area of the interfitting protrusion, such that the developed length of the bonded interface between them is up to five times the cross-sectional thickness of the flexible member.

In a further illustrated embodiment, the rigid member has a groove means which is sized and shaped so that it fits a beaded projection on the other member. In this configuration, it is important that the bifurcated arms encircle and engage a substantial surface area of the beaded protrusion. The exterior encircling arms also mate with the complementary shaped ridges formed laterally adjacent the beaded protrusion. When heat bonded together, such a structure has been determined to successfully resist separation at the joint when subjected to torsional bending forces.

In another embodiment, a mower drag shield is defined as a panel assemblage provided with a resiliently flexible member or panel which is integrally joined to, and between, a pair of rigid members in the manner described above.

Accordingly, included among the objects and features of the present invention are the following: an improved flexible joint assembly with enhanced resistance to separation when subjected to torsional and bending forces; an improved joint assembly comprising a resiliently flexible member having a protruding portion, a substantial surface area of which is securely fitted and heat bonded into the groove means of a rigid member; an improved heat bonded joint assembly which has a developed bonded interface length, in cross-section, up to five times the cross-sectional thickness of a resilient flexible panel; an improved flexible partition which is useful as a door sealing assembly; an improved flexible partition which is useful as a lawn mower drag shield; and, an improved joint assembly which inhibits separation of joined panel assemblies when the assemblies are subjected to torsion and bending forces relative to each other.

Still other objects and the scope of this invention will become apparent from the detailed description to follow when taken in conjunction with the accompanying drawings in which like parts are designated by like reference numerals throughout the several views.

BRIEF DESCRIPTION OF THE DRAWINGS

FIG. 2 is a cross-sectional view of one preferred embodiment of a flexible mower shield made according to this invention;

FIG. 5 is a fragmented perspective view of the flexible mower shield of the present invention.

DETAILED DESCRIPTION

Figure 1:
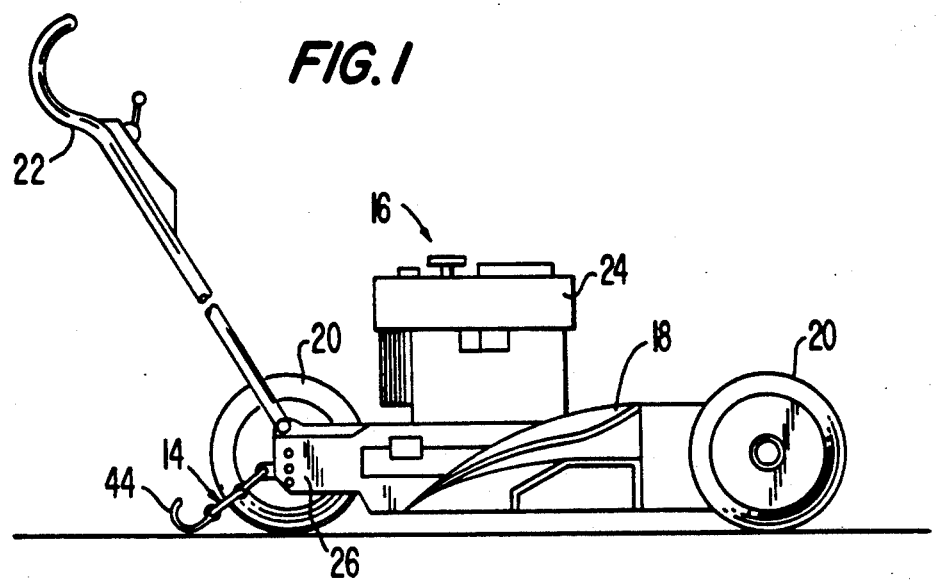
FIG. 1 is an elevational view of a lawn mower having attached thereto a flexible mower shield made according to this invention.
Figure 3:
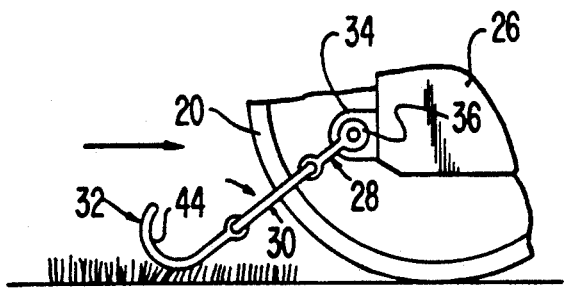
FIG. 3 is an enlarged and fragmented view of a joint of the shield of the present invention.
Figure 4:
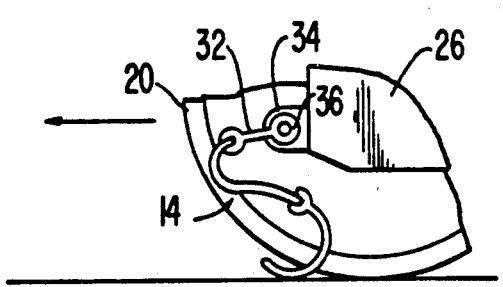
FIG. 4 is an enlarged and fragmented view of the flexible mower shield depicted being dragged behind a mower.

In FIGS. 1-5, reference is made to a preferred embodiment of an improved flexible joint assembly 10 which is utilized in a flexible partition assemblage 12 of the present invention. Such an assemblage can be conveniently used as a lawn mower shield 14 for use on a known rotary type of lawn mower 16, although it should be understood that this invention envisions a use for the assemblage 12 in a wide variety of applications. For example, one such use could be in door seals including a flexible sealing member connected to the door or door jamb. The lawn mower 16 includes a conventional housing assembly 18 carried by suitable pairs of laterally spaced, ground engaging wheels 20. Attached to the housing assembly 18 is a handle 22 which is used for guiding and pushing the lawn mower 16. The housing assembly 18 is connected to a suitable engine 24 and the assembly includes a pair of laterally spaced apart and rearwardly projecting drag shield retaining plates 26 with suitable securing holes.

Reference is now made to FIGS. 2 and 5 for more completely describing the construction of the lawn mower shield 14. The shield 14 includes a plurality of longitudinally extending extruded plastic panels 28, 30 and 32 which are joined together along their marginal edges by the improved joint assemblies, in a manner which will be discussed in detail hereinafter. The shield 14 is connected at its opposite longitudinal ends to and between the retaining plates 26 so as to be located at the rearward end of the lawn mower, thereby serving, in a conventional fashion to prevent loose stones and other debris from being thrown rearwardly by the mower's rotating cutter (not shown).

An important aspect of the present invention is the construction of improved joint assemblies 10 between the longitudinal edges of the shield panels 28-32. In this manner, the joint assemblies will ensure the necessary structural integrity of the shield 14 so as to resist separation of the panels during testing and use. Towards this end, upper and lower shield panels 28 and 32; respectively, are made of a rigid heat bondable extruded plastic material, while the intermediate shield panel 30 is a heat bondable, resiliently flexible extruded plastic material. It is preferred that the shield panels 28-32 be made of suitable polymeric materials. The present invention also envisions that they can be made of other suitable materials consistent with the objects of the present invention. For instance, the rigid panels 28, 32 can be made of polyvinyl chloride, ABS (acrylonitrile-butadiene-styrene terpolymer) polyolefin and ASA (acrylonitrile-styrene-acrylate terpolymer) while the resiliently flexible panel 30 can be made of polyvinyl chloride, TPE (thermoplastic elastomer) and polyvinyl materials. The materials selected should possess the physical and chemical characteristics necessary to obtain the improved joint assembly described herein.

Referring particularly to the upper rigid shield panel 28, it is defined as a continuous extruded rigid member having a continuous tubular segment 34, formed adjacent one longitudinally extending marginal edge, which receives at opposite ends thereof securing bolts 36 which secure the shield 14 to the retaining plates 26. An opposite longitudinal edge of the upper rigid panel 28 is formed by a pair of bifurcated projections or arms 38 defining a rigid, continuous and longitudinally extending receiving means or groove 40. Into the groove 40 is fitted a longitudinally extending and extruded bead shaped protrusion 42 of the shield's intermediate and resiliently flexible panel 30. The panel 30 is flexibly resilient which facilitates backward mower movement by allowing flexing of the shield so as to reverse upon itself (see FIG. 4). As noted, the bifurcated arms 38 substantially encompass or encircle a significant portion of the surface area of the protrusion or bead 42. The bifurcated arms 38 can extend up to about 242 degrees around the bead's periphery as best seen in FIG. 2. If the arms 38 do not encompass a sufficient bonded surface area of the bead 42 as noted above, the resulting joint would not consistently yield the degree of integrity that is desired since, for example, the joint could separate under a conventional torsion tests for mower drag shields.

Continued reference is made to FIG. 2 for depicting the resiliently flexible panel 30, wherein a pair of longitudinally extending indentations or recesses 44 are formed by and adjacent the bead 42 and longitudinally extruded ridges 46. The recesses 44 snugly accommodate terminal portions of the arms 38 prior to heat bonding thereof. Such cooperation between the arms 38, the bead 42 and the ridges 46 serves to enhance the desired strength of the joint assembly 10 since it increases the cross-sectional length dimension of the bonded interface. The lower rigid panel 32 also has a pair of bifurcated arms 34 defining a similar mounting channel 40 which cooperates with a bead shaped protrusion 42 in an interfitting manner. There is also formed a pair of indentations or recesses 44 and ridges 46 which engage snugly the terminal portions of the bifurcated arms 38. The joint assembly 10 is heat bonded together using known techniques. It should be noted that if the joints 10 were not heat bonded together, they would not define the joints that are contemplated by this invention. The developed cross-sectional bonded interface length of the joint can be up to five times the cross-sectional thickness of the resilient panel 30 and provide an improved joint construction with improved overall strength characteristics; especially in terms of its ability to withstand torsional and bending forces in the context of drag shield usage and testing. Accordingly, it is less likely to fail than heretofore known constructions.

Formed on the distal edge of the panel 32 is an enlarged J-shaped ground engaging portion 48. The ground engaging portion 48 is constructed to normally trail behind the lawn mower 16 during forward cutting movement of the latter so as to protect the user's legs. Of course, the ground engaging portion 48 can have other known configurations.

Although the previous embodiment describes the upper and lower panels as being made of a continuous rigid material, the present invention envisions, however, that such need not be the case. For instance, the upper and lower panels need only have their longitudinal portions which define the arms 38 and the mounting channel 40, rigid, while the other portions can be flexible.

It has been determined that for a satisfactory joint of the type used for drag shields, the panels 28 and 32 should have a rigidity which can be defined by a flexural modulus of 135,000 to 485,000 psi. As noted earlier the intermediate panel 30 is resiliently flexible. For a drag shield, the resilient flexibility of the panel 30 can have a tensile modulus at 100% elongation of about between 340 to 1530 psi. It will be appreciated that the foregoing ranges of flexural and tensile modulii are illustrative for mower drag shields and that other ranges are contemplated not only for drag shields and that other ranges are contemplated not only for drag shields but for door seals and other applications as well. The panel members 28, 30 and 32, in addition to having the foregoing properties which make them compatible and suitable for use as a lawn mower shield.

The rigid and resiliently flexible nature of the components forming the joint coupled with the heat bondability thereof and the significant surface area of the bonded interface of the groove and recesses, as described above, combine to define a joint assembly for mower shields and the like which successfully resists separation of the panels when subjected to various forces including torsion and bending forces of the type encountered during testing and usage of lawn mower drag shields.

Although the preferred embodiment discloses a flexible shield for a lawn mower, it will be appreciated that the flexible joint assembly of this invention permits the assemblage to be used in a variety of circumstances including household door or truck door seals.

With the present invention, it will be appreciated that certain changes may be made in the above-described flexible joint assembly and flexible partition without departing from the scope of the present invention. It is intended that the matter contained in the above description and shown in the accompanying drawings shall be interpreted as illustrative and not in a limiting sense.

What is claimed is:

1. A joint assembly comprising discrete members which are flexibly joined together and wherein:
   one of said discrete members includes receiving means made of a rigid and heat bondable material and formed on at least one marginal edge portion of said one discrete member; and,
   another of said discrete members including a resiliently flexible portion longitudinally extending along a marginal edge thereof and protruding therefrom, said protruding flexible portion being in interfitting heat bonded engagement with said rigid receiving means, said rigid receiving means interfacing with and encompassing a substantial area of said protruding portion such that the joint assembly resists separation thereof when subjected to torsional and bending forces.

2. The joint assembly of claim 1 wherein said receiving means includes a longitudinally extending mounting groove which is defined by a pair of spaced apart arms which generally encircle said interfitting member.

3. The joint assembly of claim 2 wherein said interfitting member is a beaded protrusion.

4. The joint assembly of claim 3 wherein said arms encircle said beaded protrusion up to about 242°.

5. The joint assembly of claim 3 wherein a developed length of said bond interface between said receiving means and said interfitting member is up to five times the cross section thickness of said flexibly resilient portion.

6. The joint assembly of claim 2 wherein said arms have distal portions which engage ridges on said other member.

7. The joint assembly of claim 2 wherein said rigid edge portion and said resiliently flexible portion are made of polymeric materials.

8. The joint assembly of claim 7 wherein said polymeric materials is from a group consisting PVC, ABS, ASA, polyolefins, TPE and PV.

9. The joint assembly of claim 7 wherein rigid materials have a flexural modulus of 135,000 to 485,000 psi.

10. The joint assembly of claim 9 wherein said resiliently flexible material has a tensile modulus at a 100% of elongation in a range between about 340 to 1530 psi.

11. A flexible partition assemblage comprising:
    at least one elongated panel member which has at least one longitudinal edge defining a rigid receiving means made of heat bondable material;
    a resiliently flexible member having a protruding member along a longitudinal edge which is made of heat bondable material;
    said receiving means being bonded to said protruding member and encompassing a substantial bonded surface interface therewith, such that a developed length, in cross-section, of said bonded interface is up to five times the cross-sectional thickness of said resiliently flexible member.

12. A flexible mower drag shield comprising:
    at least a pair of elongated panel assemblies, each of which has at least one longitudinal edge defining a rigid panel receiving means and made of heat bondable material;
    a resiliently flexible panel assembly having a pair of heat bondable protruding interfitting members, each of which extends from a longitudinal edge and being heat bonded to a respective one of said rigid receiving means;
    each of said rigid panel receiving means includes a pair of spaced apart arms defining a mounting groove which arms are spaced apart and encircle a respective one of said interfitting members such that the bonded interface has a developed length which is up to five times the cross-section thickness of said resiliently flexible panel assembly.

13. The drag shield of claim 12 wherein said arms also engage ridges on said flexible panel assembly, said ridges being formed laterally adjacent said interfitting member, and said interfitting member being a beaded projection.

14. The lawn mower shield of claim 12 wherein said rigid receiving means and flexibly resilient protruding members are made of polymeric materials.

15. The lawn mower shield of claim 14 wherein said polymeric materials is from a group consisting PVC, ABS, ASA, polyolefins, TPE and PV.

16. The lawn mower shield of claim 14 wherein said rigid materials have a flexural modulus of elasticity of about 135,000 to 485,000 psi.

17. The lawn mower shield of claim 16 wherein said resiliently flexible material has a tensile modulus at 100% elongation range of about 340 to 1530 psi.

18. The lawn mower shield of claim 12 wherein said arms encircle said beaded projection by up to about 242°.

* * * * *